(12) United States Patent
Heirman et al.

(10) Patent No.: US 12,111,772 B2
(45) Date of Patent: Oct. 8, 2024

(54) DEVICE, SYSTEM AND METHOD FOR SELECTIVELY DROPPING SOFTWARE PREFETCH INSTRUCTIONS

(71) Applicant: Intel Corporation, Santa Clara, CA (US)

(72) Inventors: Wim Heirman, Ghent (BE); Ibrahim Hur, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 697 days.

(21) Appl. No.: 17/133,414

(22) Filed: Dec. 23, 2020

(65) Prior Publication Data

US 2022/0197821 A1 Jun. 23, 2022

(51) Int. Cl.
*G06F 12/1027* (2016.01)
*G06F 9/30* (2018.01)
(Continued)

(52) U.S. Cl.
CPC ...... *G06F 12/1027* (2013.01); *G06F 9/30047* (2013.01); *G06F 12/0862* (2013.01); *G06F 12/0891* (2013.01); *G06F 2212/6024* (2013.01)

(58) Field of Classification Search
CPC ............. G06F 12/1027; G06F 9/30047; G06F 12/0862; G06F 12/0891; G06F 2212/6024
See application file for complete search history.

(56) References Cited

U.S. PATENT DOCUMENTS 5,796,971 A 8/1998 Emberson
6,598,128 B1 * 7/2003 Yoshioka ............ G06F 12/0835
711/143

(Continued)

FOREIGN PATENT DOCUMENTS

EP 0424163 4/1991
EP 1139222 10/2001
(Continued)

OTHER PUBLICATIONS

Notice of Allowance from European Patent Application No. 21197392.0 notified Feb. 7, 2023, 8 pgs.
(Continued)

*Primary Examiner* — Michael Krofcheck
*Assistant Examiner* — Janice M. Girouard
(74) *Attorney, Agent, or Firm* — Essential Patents Group, LLP

(57) ABSTRACT

Techniques and mechanisms for providing information to determine whether a software prefetch instruction is to be executed. In an embodiment, one or more entries of a translation lookaside buffer (TLB) each include a respective value which indicates whether, according to one or more criteria, corresponding data has been sufficiently utilized. Insufficiently utilized data is indicated in a TLB entry with an identifier of an executed instruction to prefetch the corresponding data. An eviction of the TLB entry results in the creation of an entry in a registry of prefetch instructions. The entry in the registry includes the identifier of the executed prefetch instruction, and a value indicating a number of times that one or more future prefetch instructions are to be dropped. In another embodiment, execution of a subsequent prefetch instruction—which also corresponds to the identifier—is prevented based on the registry entry.

20 Claims, 15 Drawing Sheets

(51) Int. Cl.
   *G06F 12/0862* (2016.01)
   *G06F 12/0891* (2016.01)

(56) References Cited

U.S. PATENT DOCUMENTS

| | | | |
|---|---|---|---|
| 9,158,705 B2 | 10/2015 | Topp et al. | |
| 9,311,239 B2 | 4/2016 | Cooray et al. | |
| 10,303,609 B2 | 5/2019 | Heirman et al. | |
| 10,489,297 B2 | 11/2019 | Heirman et al. | |
| 10,642,618 B1* | 5/2020 | Hakewill | G06F 9/30054 |
| 2003/0131212 A1 | 7/2003 | Liptay et al. | |
| 2005/0071571 A1* | 3/2005 | Luick | G06F 12/0862 |
| | | | 711/138 |
| 2006/0224857 A1 | 10/2006 | O'Connor et al. | |
| 2007/0136534 A1 | 6/2007 | Mesard et al. | |
| 2010/0250853 A1* | 9/2010 | Krieger | G06F 12/1027 |
| | | | 711/E12.059 |
| 2011/0072213 A1* | 3/2011 | Nickolls | G06F 9/3836 |
| | | | 711/E12.024 |
| 2011/0202724 A1* | 8/2011 | Kegel | G06F 12/1081 |
| | | | 711/E12.017 |
| 2011/0208918 A1* | 8/2011 | Raikin | G06F 12/0862 |
| | | | 711/E12.001 |
| 2014/0052955 A1* | 2/2014 | Moll | G06F 30/20 |
| | | | 711/205 |
| 2014/0181459 A1 | 6/2014 | Venkumahanti et al. | |
| 2015/0026414 A1* | 1/2015 | Kalamatianos | G06F 12/06 |
| | | | 711/137 |
| 2019/0102302 A1* | 4/2019 | Taht | G06F 12/0862 |
| 2019/0163641 A1 | 5/2019 | Cooray et al. | |
| 2019/0196968 A1* | 6/2019 | Beckmann | G06F 12/0811 |

FOREIGN PATENT DOCUMENTS

| | | |
|---|---|---|
| EP | 1353267 | 10/2003 |
| EP | 1622007 | 2/2006 |

OTHER PUBLICATIONS

Extended European Search Report from European Patent Application No. 21197392.0 notified Mar. 22, 2022, 14 pgs.

Park, Jang Suk, et al., "A software-controlled prefetching mechanism for software-managed TLBs", Microprocessing and Microprogramming 41, 1995, pp. 121-136.

* cited by examiner

400

| Logical Address 410 | Physical address 412 | Permission 414 | Utilization value 416 |
|---|---|---|---|
| 401 ~ 0xabcd00 | 0x001200 | r w x | 0x1234 |
| 402 ~ 0xbcde00 | 0x042100 | r – – | 0 |
| ⋮ | ⋮ | ⋮ | ⋮ |

| Instruction identifier 460 | Count value 462 |
|---|---|
| 451 ~ 0x1234 | 8 |
| 452 ~ 0x2345 | 0 |
| ⋮ | ⋮ |

FIG. 4B

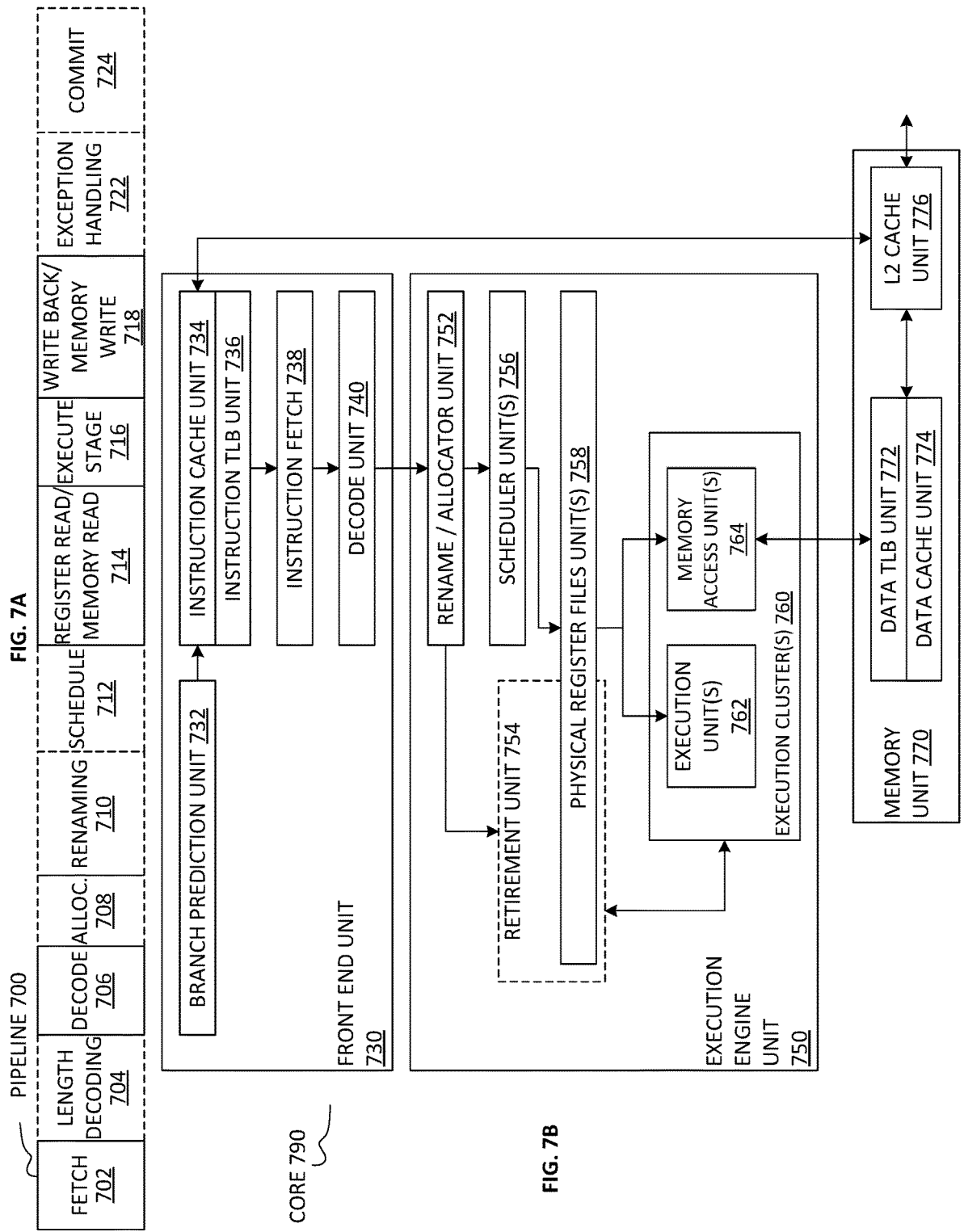

DEVICE, SYSTEM AND METHOD FOR SELECTIVELY DROPPING SOFTWARE PREFETCH INSTRUCTIONS

BACKGROUND

1. Technical Field

This disclosure generally relates to processing devices and more particularly, but not exclusively, to prefetch operations performed based on information in a translation lookaside buffer.

2. Background Art

Data prefetching, or early fetching of data into a cache, is a feature implemented in a processor to augment a probability of having requested data in a timely manner, and thereby maintain a high processing efficiency. When the data is available at a processor cache, a number of cycles where the processor stalls may be reduced. For example, a processor may stall when waiting for data to come back from more distant (with respect to the processor) cache levels or memory. Data prefetches typically rely on the searching of a translation lookaside buffer (TLB) for address translation information which identifies a location from which data is to be prefetched.

Software prefetch instructions can yield significant performance improvement for slow-to-fetch data. However, applications are frequently inaccurate in predicting which prefetched data is actually loaded or otherwise put to use. In many use cases, a number of these unused software prefetches are to be expected, which tends to result in the pollution of one or more caches.

In an attempt to mitigate such cache pollution, some processors selectively drop (that is, forego executing) a software prefetch instruction which has address information that results in a TLB miss. Such dropping of a prefetch instruction also foregoes the creation of a TLB entry for the address information. However, there are instances where such a TLB entry might have otherwise been useful in the execution of one or more subsequent instructions. Accordingly, processor cache management is sometimes at odds with the efficient management of a TLB, in one or more respects. As successive generations of processors continue to increase in speed and capability, there is expected to be an increasing premium placed on improvements to the accessibility of data for use in software execution.

BRIEF DESCRIPTION OF THE DRAWINGS

The various embodiments of the present invention are illustrated by way of example, and not by way of limitation, in the figures of the accompanying drawings and in which:

FIGS. 4A, 4B illustrate data diagrams each showing respective features of reference information to track software prefetch instructions according to an embodiment.

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
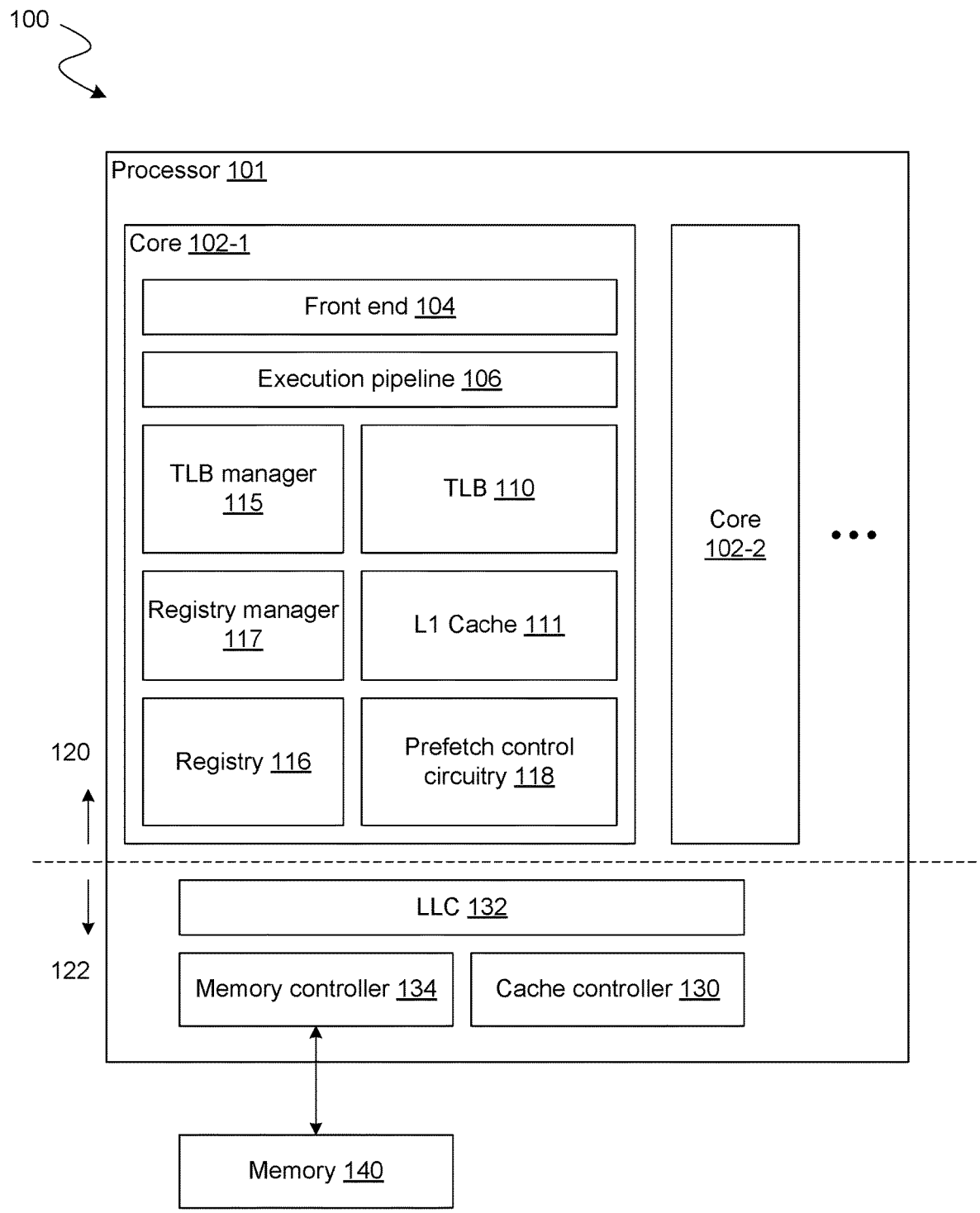
FIG. 1 illustrates a functional block diagram showing features of a system to determine whether a software prefetch is to be performed according to an embodiment.

Embodiments discussed herein variously provide techniques and mechanisms for tracking software instructions which result in the prefetching of data. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including processors which provide data prefetch functionality.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Certain features of various embodiments are described herein with reference to providing utilization information for various entries of a translation lookaside buffer (TLB) and, based on such utilization information, providing of a registry of prefetch instructions. In some embodiments, the registry of prefetch instructions is made available to facilitate a determination as to whether the execution of a given prefetch instruction is to be prevented.

As used herein, "utilization information" refers to information which specifies or otherwise indicates whether some data (for example, data which has been prefetched to a cache of a processor in anticipation of a later instruction to use said data) is—according to some predefined criteria—sufficiently utilized or, alternatively, insufficiently utilized. In an embodiment, prefetched data is insufficiently utilized where such data, after prefetching thereof, has yet to be loaded once (or some other minimum threshold number of times) for use in an execution pipeline of the processor.

By way of illustration and not limitation, utilization information comprises a parameter (referred to herein as a "utilization indicator") which, if set to one value—e.g., zero ("0")—indicates that corresponding prefetched data is sufficiently utilized. By contrast, the setting of such a parameter to some alternative value—e.g., an identifier for a corresponding software instruction—indicates that corresponding prefetched data is insufficiently utilized.

In various embodiments, such an identifier for a software instruction—or "instruction identifier" herein—includes, or is otherwise based on, a value of an instruction pointer (program counter) which points to the corresponding software instruction. In one such embodiment, an instruction identifier comprises a hash which is calculated based on the value of a pointer to a corresponding software instruction. In an illustrative scenario according to various embodiment, an instruction identifier serves to identify either/both of one instance of a software instruction being provided for possible execution, and another instance of the software instruction being provided (e.g., with one or more of the same operands and/or with one or more different operands) at a different time for possible execution.

FIG. 1 illustrates features of a system 100 which selectively prevents execution of a prefetch instruction according to an embodiment. System 100 illustrates one example of an embodiment which maintains an address translation with a translation lookaside buffer (TLB) to facilitate address translation for memory accesses. Based on the eviction of entries from such a TLB, some embodiments variously register identifiers of prefetch instructions for which corresponding prefetched data was deemed underutilized. Based on a registry of such prefetch instructions, said embodiments determine whether one or more subsequent prefetch instructions are to be dropped.

As shown in FIG. 1, system 100 comprises a processor 101 and a memory 140 coupled thereto. Processor 101 comprises a core region 120 and an uncore 122. Core region 120 includes multiple processor cores 102 (for example), but functionality disclosed herein is additionally or alternatively supported by a single core processor, in other embodiments. More particularly, processor 101 includes a first processor core 102-1 and a second processor core 102-2, but other embodiments include more or fewer processor cores. In some embodiments, cores 102-1, 102-2 (and/or one or more other cores of processor 101) communicate via a shared bus, a point-to-point interconnection, or in some other manner.

In the example embodiment shown, core 102 includes a front-end 104, an execution pipeline 106, and a cache memory (such as the illustrative shown). For example, L1 data cache 111 is an architecturally closest cache to execution pipeline 106—e.g., wherein L1 data cache 111 is dedicated for caching data rather than instructions. In some embodiments, front-end 104 is operable to fetch instructions from an instruction cache (not shown) and to schedule the fetched instructions for execution. For example, execution pipeline 106 includes logic and microcode to decode and execute various mathematical, logical, memory access, and flow control instructions. Thus, front-end 104 is responsible for ensuring that a steady stream of instructions is fed to execution pipeline 106 while execution pipeline 106 is responsible for executing instructions and processing the results. In some embodiments, execution pipeline 106 includes two or more arithmetic pipelines in parallel, two or more memory access or load/store pipelines in parallel, and two or more flow control or branch pipelines. Additionally or alternatively, execution pipeline 106 includes one or more floating point pipelines. In some embodiments, execution pipeline 106 includes register and logical resources for executing instructions out of order, executing instructions speculatively, or both.

During execution of memory access instructions, execution pipeline 106 attempts to execute the instruction by accessing a copy of data stored in the applicable memory address residing, for example, in memory 140, or in a lower level cache memory of a cache memory subsystem that includes two or more cache memories arranged in a hierarchical configuration. Depicted elements of such a cache memory subsystem include, for example, the L1 data cache 111 and a last level cache (LLC) 132 in the uncore 122. Other elements of the cache memory subsystem include a per-core instruction cache (not depicted) that operates in conjunction with front end 104 and one or more per-core intermediate caches (not depicted). In an embodiment, uncore 122 further comprises a cache controller 130 to implement a cache coherency policy and, in conjunction with a memory controller 134, to maintain coherency between a system memory 140 and the various cache memories.

In some embodiments, the cache memory subsystem for processor 101 includes L1 data and instruction caches per-core, an intermediate or L2 cache memory per-core that includes both instructions and data, and the LLC 132, which includes instructions and data and is shared among multiple cores 102. If a memory access instruction misses in the L1 data cache, execution of the applicable program or thread stalls or slows while the cache memory subsystem accesses the various cache memories until a copy of the applicable memory address is found.

In an embodiment, processor 101 further comprises a translation lookaside buffer TLB 110 which is to store address translation information that facilitates (for example) a translation of a virtual address to a corresponding physical address for a given memory location. A TLB manager 115 of processor 101 comprises circuitry to manage TLB 110—e.g., wherein such management includes variously creating TLB entries, updating TLB entries, evicting TLB entries, and/or the like. In one such embodiment, TLB manager 115 manages the provisioning of utilization information which corresponds to (for example, is included in) a given TLB entry. For example, TLB manager 115 variously provides utilization values—corresponding to different respective TLB entries—which each indicate, for some corresponding prefetched data, a respective classification of said prefetched data. In various embodiments, such a utilization value indicates that prefetched data is (according to some predetermined criteria) insufficiently utilized, or sufficiently utilized.

To facilitate efficient data prefetches, processor 101 further comprises a registry 116, and a registry manager 117 comprising circuitry to manage a registration of prefetch instructions with registry 116. For example, registry manager 117 provides functionality to keep track of values, for each of one or more registered prefetch instructions, which each indicate a respective count of future prefetch instructions to be dropped. In an embodiment, an eviction of an entry from TLB 110 results in a registration of a corresponding prefetch instruction in registry 116.

Figure 2:
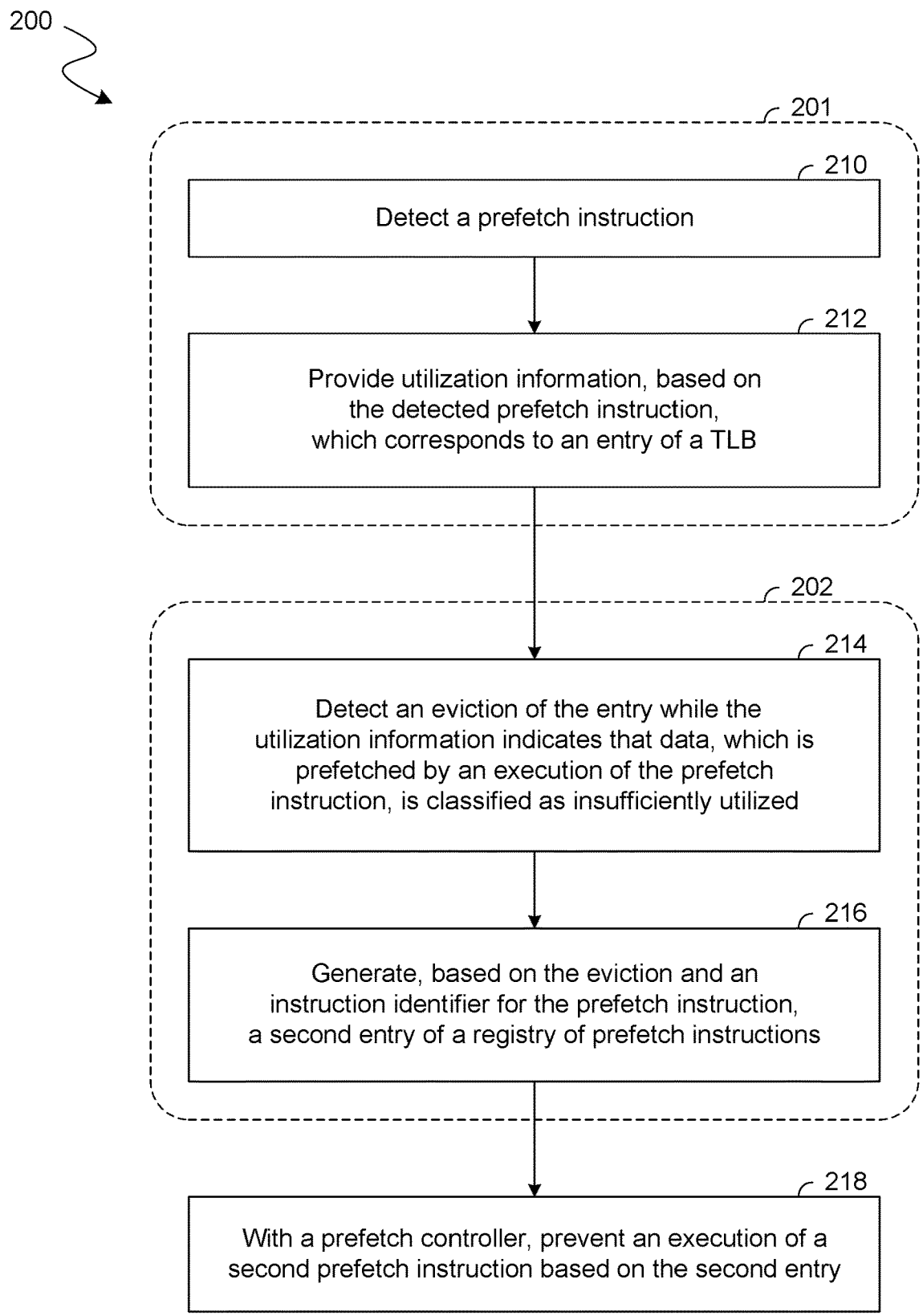
FIG. 2 illustrates a flow diagram showing features of a method to provide prefetch functionality of a processor according to an embodiment.

FIG. 2 illustrates features of a method 200 for determining, according to an embodiment, whether a prefetch instruction is to be dropped by circuitry of a processor. Method 200 is one example of an embodiment which manages utilization information for one or more entries of a TLB and/or manages a registry of prefetch instructions. Some or all operations of method 200 are performed with circuitry of processor 101, for example.

Figure 3:
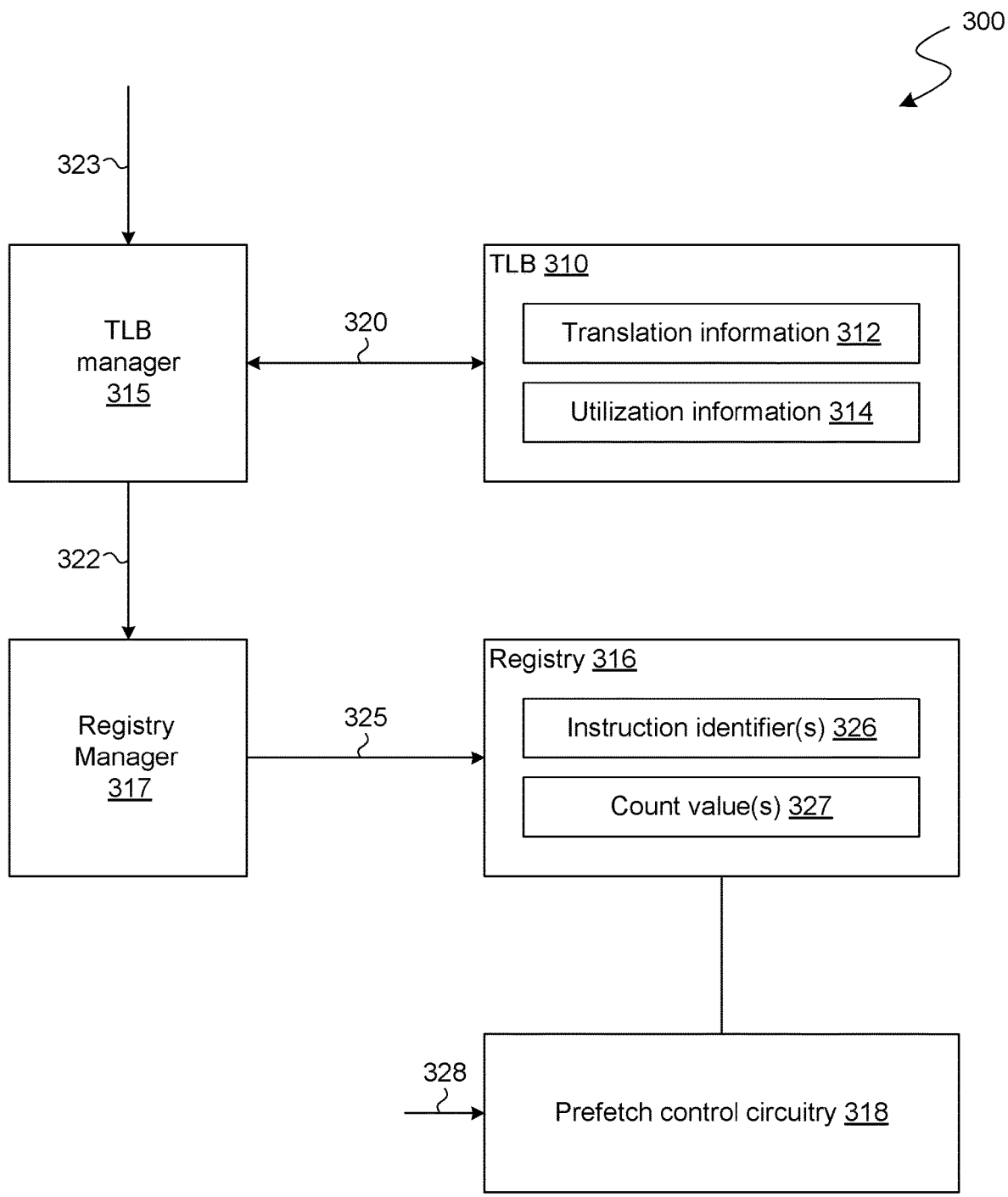
FIG. 3 illustrates a functional block diagram showing features of a processor to execute a software prefetch according to an embodiment.

To illustrate certain features of various embodiments, method 200 is described herein with reference to a processor 300 which is shown in FIG. 3. However, some embodiments perform method 200 with any of various other suitable processor devices. In an embodiment, processor 300 provide some or all features of processor 101—e.g., wherein processor 300 comprises a TLB 310, a TLB manager 315, a registry of prefetch instructions 316, a registry manager 317, and prefetch control circuitry 318 that, for example, correspond functionally to TLB 110, TLB manager 115, registry 116, registry manager 117, and prefetch control circuitry 118 (respectively).

As shown in FIG. 2, method 200 comprises operations 201 performed by first manager circuitry which provides functionality such as that of TLB manager 115. In an embodiment, operations 201 comprise (at 210) detecting a prefetch instruction, wherein an entry in a translation lookaside buffer (TLB) is generated based on the first prefetch instruction. In an embodiment, an execution of the prefetch instruction results in data being prefetched to a cache of a processor which performs some or all of method 200.

For example, referring to processor 300, TLB manager 315 receives any of a variety of one or more signals—e.g., including the illustrative signal 323 shown—which indicate, in various embodiments, that TLB 310 is to include an entry for an address which is indicated by a software instruction that has executed (or that will execute). For example, signal 323 indicates that the software instruction is a prefetch instruction—e.g., wherein signal 323 specifies or otherwise indicates an instruction pointer (or program counter) value for the software instruction. In some embodiments, signal 323 indicates that a TLB entry—previously created based on an older instruction—is to be evicted so that TLB 310 can provide an entry based on a more recent instruction.

Operations 201 further comprise (at 212) providing utilization information, based on the detecting at 210, which corresponds to—e.g., which is included in—the TLB entry. In an embodiment, the utilization information comprises a value which indicates that data—which has been (or is to be) prefetched by the execution of the prefetch instruction—is classified as insufficiently utilized. In one such embodiment, setting such a utilization indicator to some particular value—e.g., zero ("0")—serves to indicate to circuitry of the processor that the corresponding prefetched data has been classified, according to one or more predetermined criteria, as sufficiently utilized. By contrast, setting the utilization indicator to any of one or more alternative values—e.g., including a value of an instruction identifier—serves to indicate that, according to the one or more predetermined criteria, the prefetched data is insufficiently utilized.

For example, referring again to processor 300, TLB manager 315 participates with TLB 310 in communications 320 which facilitate one or more operations including, but not limited to, creating an entry of TLB 310, evicting an entry of TLB 310, and/or updating or otherwise accessing utilization information which is included in (or otherwise corresponds to) a given entry of TLB 310. By way of illustration and not limitation, TLB manager 315 participates in communications to update utilization information based on an indication—by signal 323, for example—that some previously prefetched data has been loaded for use in an execution pipeline of processor 300.

In the example embodiment of processor 300, an entry of TLB 310 comprises translation information 312 which specifies or otherwise indicates a correspondence of a first address to one or more other addresses (e.g., including a correspondence of a virtual address to another virtual address and/or to a physical address). This TLB entry is created (for example) based on the execution of a software instruction to prefetch data from an address which is indicated by translation information 312. In one such embodiment, the TLB entry further includes (or otherwise corresponds to) utilization information 314 which indicates a current classification of the prefetched data as being, according to some predetermined criteria, sufficiently utilized (or, alternatively, insufficiently utilized).

Method 200 further comprises operations 202 performed by second manager circuitry which provides functionality such as that of registry manager 117. In an embodiment, operations 202 comprise (at 214) detecting an eviction of the TLB entry at a time when the utilization information, provided at 212, still indicates that the prefetched data is classified as insufficiently utilized. Operations 202 further comprise (at 216) generating a second entry in a registry of prefetch instructions, where said generating is based on the eviction detected at 214 (and, for example, on the instruction identifier). For example, generating the second entry at 216 is based on the prefetched data being classified as insufficiently utilized (e.g., wherein such generating would be prevented in an alternative scenario wherein the prefetched data is classified as sufficiently utilized). In an embodiment, the second entry comprises the instruction identifier (or a value which is based on the instruction identifier), and a count value which represents a number of subsequent prefetch instruction to be dropped.

For example, referring again to processor 300, TLB manager 315 communicates a signal 322 which indicates to registry manager 317 that the TLB entry which comprises translation information 312 has been (or is to be) evicted from TLB 310 when, for example, utilization information 314 indicates that the corresponding prefetched data is insufficiently utilized. In one example embodiment, utilization information 314 indicates such insufficient utilization with an instruction identifier for the prefetch instruction which originally targeted the prefetched data.

Based on signal 322, registry manager 317 sends a signal 325 to create, update or otherwise access an entry of registry 316. In the example embodiment shown, registry 316 comprises one or more instruction identifiers 326 which each correspond to a different respective prefetch instruction that previously resulted in both a prefetching of data and a creation of a corresponding TLB entry. For example, each such corresponding TLB entry was evicted from TLB 310 prior to the corresponding prefetched data being classified as sufficiently utilized. In an embodiment, registry 316 further comprises one or more count values 327 which each correspond to a different respective identifier of the one or more instruction identifiers 326. The one or more count values 327 each indicate a respective number of one or more future prefetch instructions (if any) are to be dropped—e.g., wherein said one or more future prefetch instructions each correspond to the same instruction identifier.

Method 200 further comprises (at 218) preventing an execution of a second prefetch instruction based on the second entry—e.g., where such preventing is by prefetch control circuitry 118 or other suitable prefetch controller. In some embodiments, the count value is initially set at 216 to represent a threshold minimum number of one or more prefetch instructions—which each correspond to the instruction identifier in the registry entry—for which execution is to be prevented (assuming such execution is ever under consideration). In one such embodiment, method 200 decrements or otherwise updates the count value one or more times as prefetch instructions are successively detected (and dropped). In an embodiment, such one or more prefetch instructions include the second prefetch instruction (for which execution is prevented at 218)—e.g., wherein based on a detection of the second prefetch instruction, method 200 further decrements or otherwise updates the count value to indicate that one less prefetch instruction has yet to be dropped.

For example, referring again to processor 300, prefetch control circuitry 318 is coupled to receive an indication (e.g., via a signal 328 from an execution pipeline or other suitable resource) which specifies or otherwise indicates that the execution of a prefetch instruction is under consideration. In one such embodiment, signal 328 includes or otherwise indicates a program counter value, or other such instruction identifier, for the prefetch instruction in question. Based on the instruction identifier indicated by signal 328, prefetch control circuitry 318 searches registry 316 for a match with any of the one or more instruction identifiers 326. Where such a match is detected, prefetch control circuitry 318 further determines whether one of the one or more count values 327 (corresponding to the matching one of the one or more instruction identifiers 326) indicates that the prefetch instruction in question is to be dropped or, alternatively, executed. Prefetch control circuitry 318 then generates one or more signals to selectively prevent, or enable, the execution of the prefetch instruction based on the corresponding count value.

In some embodiments, method 200 additionally or alternatively performs operations (not shown) to selectively prevent a generation of another entry of the registry of prefetch instructions. For example, referring again to processor 300, signal 323 alternatively or in additionally indicates that a software instruction has loaded (or will load) some already prefetched data, in a cache of processor 300 (not shown), for use by an execution pipeline (not shown) of processor 300. In various embodiments, TLB manager 315 determines, based on such loading, that utilization information, for some other TLB entry (if any) which corresponds to such prefetched data, is to be updated to indicate that the prefetched data is sufficiently utilized. Subsequently, TLB manager 315 detects (e.g., based on signal 323) that this other TLB entry is to be evicted while the utilization information for said TLB entry indicates that the corresponding prefetched data is sufficiently utilized. Based on this indication, registry manager 317 and/or registry manager 317 prevent the generation of an entry in registry 316 which would otherwise be based on this other evicted TLB entry.

FIGS. 4A, 4B show (respectively) features of a translation lookaside buffer (TLB) 400 and a registry 450 of prefetch instructions according to an embodiment. In an embodiment, TLB 400 provides functionality such as that of TLB 110 or TLB 310—e.g., wherein registry 450 provides functionality of registry 116 or registry 316.

As shown in FIG. 4A, entries of TLB 400 (including, for example, the illustrative entries 401, 402 shown) each comprise a respective logical address field 410 and a respective physical address field 412 which corresponds to logical address field 410. For example, address translation using an entry of TLB 400 comprises identifying a targeted physical address based on an instruction which targets a corresponding logical address. In one such embodiment, entries of TLB 400 each further comprise (or otherwise correspond to) a respective utilization value field 416 which is available to store utilization information as variously described herein. Although some embodiments are not limited in this regard, entries of TLB 400 each further comprise a respective one or more other fields—e.g., including the illustrative permission field 414 shown.

In an illustrative scenario according to one embodiment, entry 401 is provided at TLB 400 based on an execution of a first software prefetch instruction. Based on the first software prefetch instruction, the utilization value field 416 of entry 401 stores a utilization value which specifies or otherwise indicates whether utilization (if any) of first data—prefetched by execution of the first software prefetch instruction—has satisfied some predefined criteria. For example, the first prefetched data (which, in an embodiment, is in a processor cache) is deemed insufficiently utilized until it has been loaded for use by an execution pipeline of a processor. In one such embodiment, an instruction identifier (in this example, 0x1234) for the first software prefetch instruction indicates that the corresponding first prefetched data is currently classified as insufficiently utilized.

In one such embodiment, a subsequent eviction of entry 401 from TLB 400 results in a creation of an entry 451 in table 450 (due to the utilization value field 416 of entry 401 indicating that the first prefetched data is insufficiently utilized). For example, as shown in FIG. 4B, entries of table 450 each comprise a respective instruction identifier field 460 and a respective count value field 462 to indicate a number of prefetch instructions (each corresponding to the same instruction identifier) which are to be dropped.

By contrast, entry 402 is provided at TLB 400 based on an execution of a second software prefetch instruction—where a subsequent loading of the second prefetched data results in the utilization value field 416 of entry 402 being set to a zero ("0") to indicate that the second prefetched data is sufficiently utilized. In one such embodiment, such classifying of the second prefetched data as sufficiently utilized prevents the creation of an entry in registry 450 that might otherwise take place based on a subsequent eviction of entry 402 from TLB 400. In various embodiments, the utilization value field 416 for a given entry of TLB 400 is set to a zero value (to prevent the creation of a corresponding entry in a registry 450) if the TLB entry in question is created based on an instruction other than a software prefetch instruction. As illustrated in the description of method 200, the respective count value fields 462 of entries 451, 452 are variously updated over time as prefetch instructions are selectively dropped based on table 450.

Figure 5A:
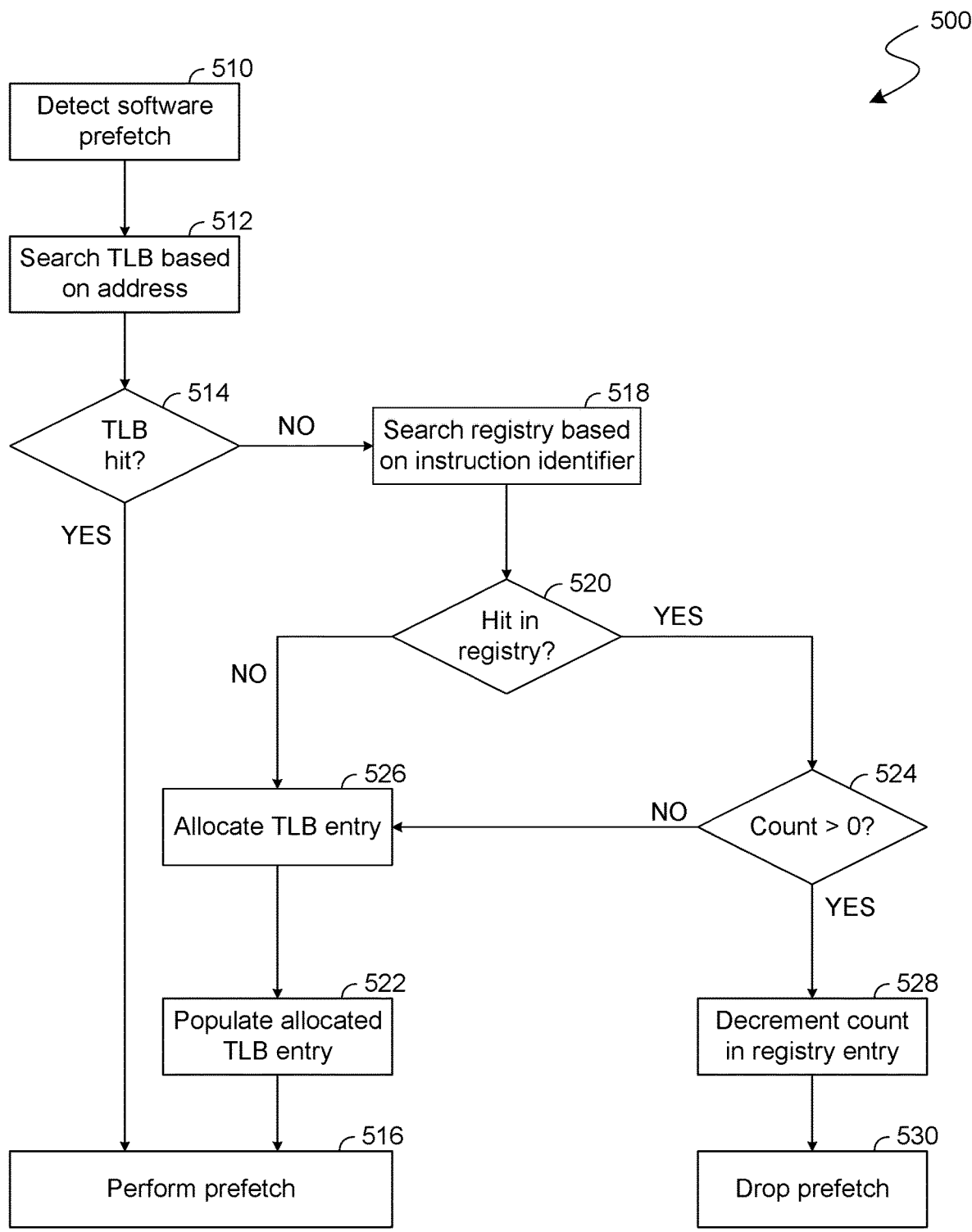
FIGS. 5A, 5B illustrate flow diagrams each showing features of a respective method to manage a translation lookaside buffer according to a corresponding embodiment.

FIG. 5A illustrates features of a method 500 to process a software prefetch according to an embodiment. Method 500 is one example of an embodiment wherein the execution (if any) of a software prefetch is selectively performed based on whether a TLB includes an entry for a corresponding virtual address, and—in some embodiments—whether the prefetch instruction in question is of a type which is currently registered as one for which prefetches are to be prevented. In some embodiments, method 500 is performed with one or more of TLB 110, TLB manager 115, registry 116, registry manager 117, or prefetch control circuitry 118—e.g., wherein method 200 includes operations of method 500.

As shown in FIG. 5A, method 500 comprises (at 510) detecting a software instruction, the execution of which—if any—is to prefetch data from a relatively more distant memory to a cache memory of a processor. The prefetch instruction includes, or otherwise corresponds to, a virtual address which indicates a memory location from which the data in question is to be prefetched. In some embodiments, the prefetch instruction further corresponds to an instruction identifier which (for example) is equal to, includes, or is otherwise based on a value of a pointer to the prefetch instruction.

Method 500 further comprises (at 512) searching a TLB, based on the virtual address which corresponds to the prefetch instruction, for another address (e.g., a physical address) for the targeted memory location. In an embodiment, the searching at 512 comprises TLB manager 115 searching TLB 110 (or, for example, TLB manager 315 searching TLB 310). Method 500 further comprises (at 514) determining whether the search at 512 has hit any entry in the TLB.

Where a TLB hit is indicated at 514 (that is, where the search at 512 identifies a TLB entry for the virtual address), method 500 (at 516) performs the data prefetch which is indicated by the prefetch instruction. Where a TLB miss is instead indicated at 514, method 500 (at 518) performs a search of a registry of prefetch instructions—e.g., where the registry search is based on the instruction identifier which corresponds to the prefetch instruction. For example, the search at 518 comprises registry manager 117 searching registry 116 (or, for example, registry manager 317 searching registry 316). Method 500 subsequently evaluates (at 520) whether the search at 518 has hit an entry in the registry of prefetch instructions.

Where a registry miss is indicated at 520—that is, where no entry of the registry has been identified as including the instruction identifier—method 500 (at 526) allocates an entry of the TLB and (at 522) populates the allocated TLB entry with address translation information for the virtual address provided by the prefetch instruction. Furthermore, method 500 performs the data prefetch (at 516) which is indicated by the prefetch instruction.

Where a registry hit is instead indicated at 520—that is, where an entry of the registry is identified as including the instruction identifier—method 500 (at 524) determines whether the count value of the identified registry entry is greater than zero (or otherwise indicates that prefetches corresponding to the instruction identifier are still to be prevented). Where it is determined at 524 that the count value of the identified registry entry equal to (or, for example, less than) zero, method 500 performs the allocation of a TLB entry (at 526), the populating of said TLB entry (at 522), and the prefetching of the data (at 516). Where it is instead determined at 524 that the count value of the identified registry entry is greater than zero, method 500 decrements the count value (at 528), and drops the prefetch instruction (at 530).

Figure 5B:
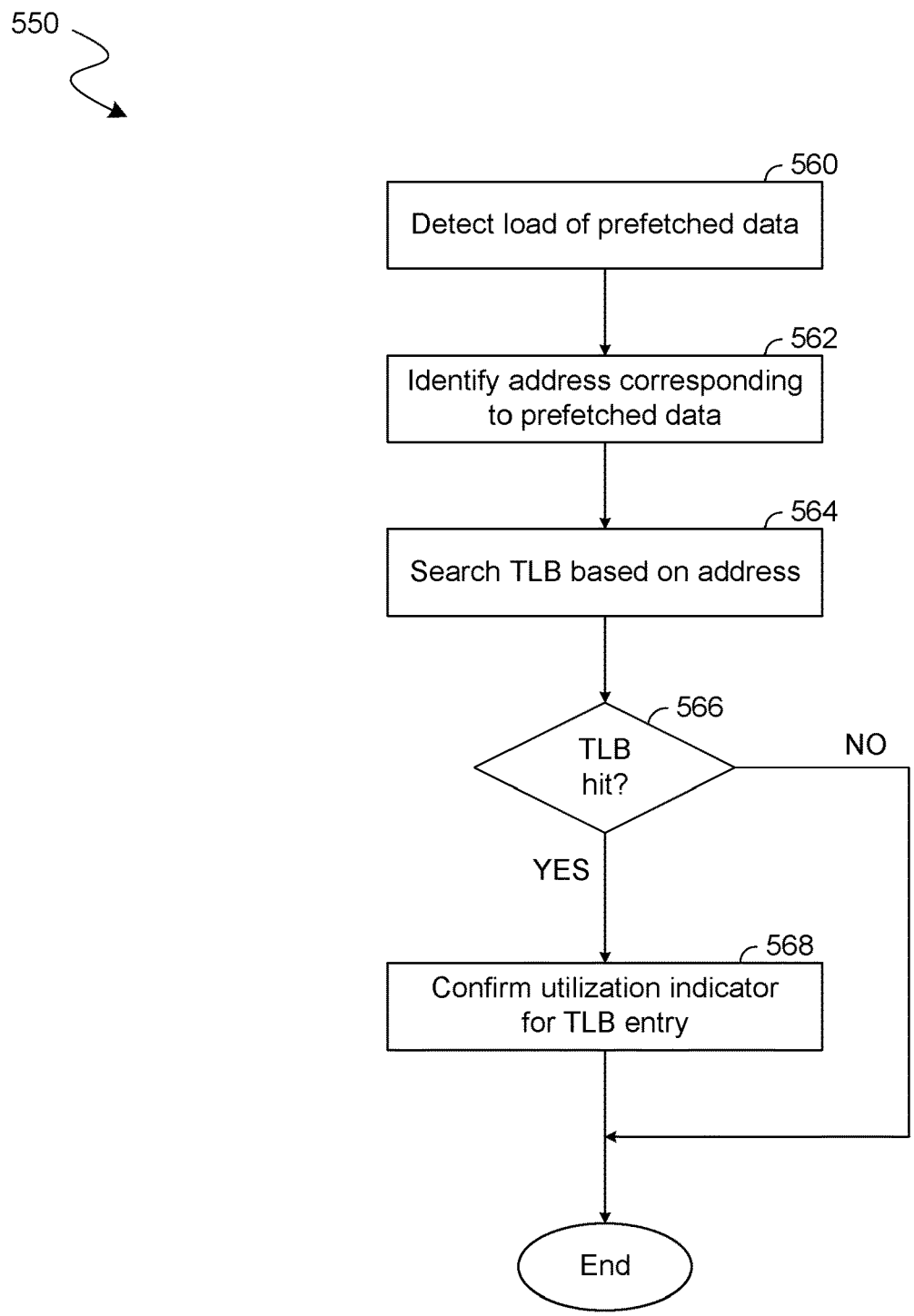

FIG. 5B shows features of a method 550 to maintain utilization information for one or more entries of a TLB according to an embodiment. Method 500 illustrates one embodiment wherein a utilization indicator—which corresponds to (e.g., which is included in) an entry of a TLB—is updated to indicate a use of prefetched data which, for example, corresponds to an address indicated by the TLB entry. In some embodiments, method 550 is performed (for example, in combination with method 500) with one or more of TLB 110, or TLB manager 115—e.g., wherein method 200 includes operations of method 550.

As shown in FIG. 5B, method 550 comprises (at 560) detecting that prefetched data, in a cache of a processor, has been loaded for use by an execution pipeline of the processor. In an embodiment, the data was prefetched to the cache (that is, prior to the loading detected at 560) by the execution of a software prefetch instruction—e.g., wherein said software prefetch instruction resulted in the creation of an entry in a TLB such as one of TLB s 110, 310. In some embodiments, method 500 performs a search to detect whether any such TLB entry has been evicted, and/or whether a corresponding utilization indicator is to be updated.

For example, method 550 further comprises (at 562) identifying an address—e.g., a virtual address—which corresponds to the prefetched data, and (at 564) searching the TLB based on said address. Method 550 further comprises (at 566) determining whether the search at 564 has hit any entry in the TLB. Where a TLB hit is indicated at 566 (that is, where the search at 564 finds a TLB entry for the address identified at 562), method 550 (at 568) confirms that the corresponding utilization indicator indicates a sufficiently utilized prefetched data. In one such embodiment, the confirming at 568 comprises setting the utilization indicator to zero—e.g., to erase an instruction identifier from the utilization indicator. Otherwise, method 550 foregoes any such confirming (e.g., updating) of a utilization indicator.

Figure 6:
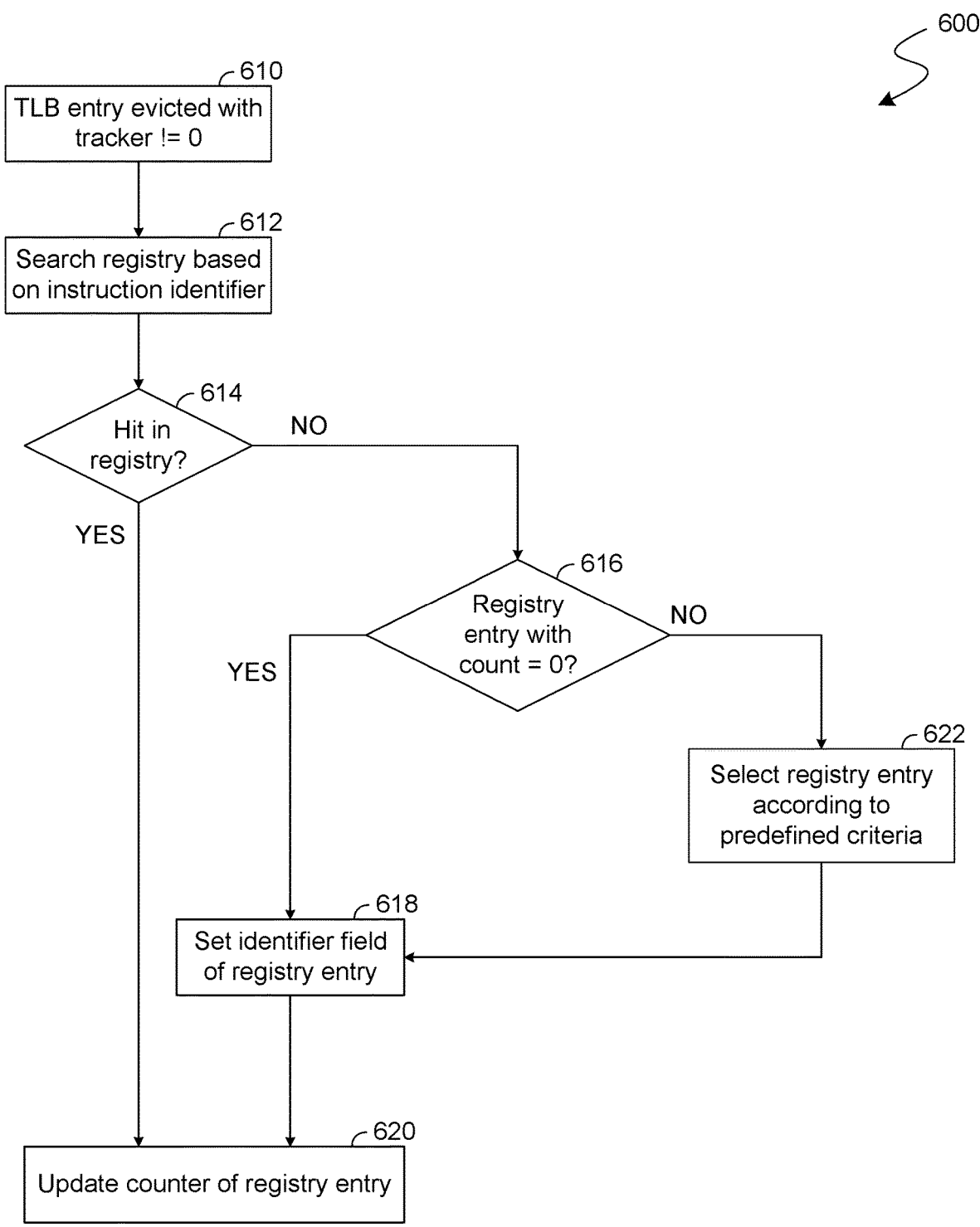
FIG. 6 illustrates a flow diagram showing features of a method to provide a registry of software prefetch instructions according to an embodiment.

FIG. 6 illustrates features of a method 600 to manage a registry of prefetch instructions according to an embodiment. Method 600 is one example of an embodiment wherein, for each of one or more prefetch instructions, an instruction identifier for the prefetch instruction is kept in a registry based on the eviction of a TLB entry which includes (or is otherwise identified as corresponding to) the instruction identifier. The registry facilitates the determining of whether—e.g., for at least some predetermined number of times—any subsequent prefetch instruction which corresponds to that same instruction identifier is to be dropped (wherein the desired data prefetch is prevented). In some embodiments, method 200 is performed (for example, in combination with one or both of methods 500, 550) with one or more of TLB 110, TLB manager 115, registry 116, registry manager 117, or prefetch control circuitry 118—e.g., wherein method 200 includes operations of method 600.

As shown in FIG. 6, method 600 comprises (at 610) detecting the eviction—from a TLB such as one of TLBs 110, 310—of an entry which corresponds to an underutilized prefetched data. In the example embodiment shown, the detecting at 610 comprises determining that the evicted TLB entry includes, or is otherwise identified as corresponding to, a tracker value which is not equal to zero (e.g., wherein the tracker value is equal to an identifier of an instruction which resulted in the underutilized prefetched data).

Method 600 further comprises (at 612) performing a search of a registry of prefetch instructions—such as one of registries 116, 316—based on the TLB eviction which is detected at 610. In an embodiment, the registry search at 612 comprises searching for an entry of the registry which includes the instruction identifier that corresponds to (for example, which is included in) the evicted TLB entry.

Method 600 further comprises (at 614) determining whether the search at 612 has hit an entry in the registry of prefetch instructions. Where a registry hit is indicated at 614, method 600 (at 620) performs an update to a counter value of the registry entry which has been identified as including the instruction identifier. In an embodiment, the updating at 620 sets the counter value to specify or otherwise indicate a threshold number of one or more subsequent prefetch instructions (if any) that are to be dropped, where said one or more subsequent prefetch instructions each correspond to the instruction identifier in question.

Where a registry miss is instead indicated at 614, method 600 performs operations to find a location in the registry where the prefetch instruction which corresponds to the evicted TLB entry is to be registered. By way of illustration and not limitation, such operations include determining (at 616) whether there is an entry of the registry which currently has a count value which is equal to zero (or which otherwise indicates that a sufficient number of corresponding prefetch instructions have been dropped). Where it is determined at 616 that a registry entry has a count value equal to (or, for example, less than) zero, method 600 (at 618) sets an identifier field of that registry entry to include the instruction identifier which corresponds to the evicted TLB entry. After setting the identifier field at 618, method 600 (at 620) sets the counter value of the registry entry to specify or otherwise indicate a threshold number of one or more subsequent prefetch instructions (if any) that are to be dropped.

Where it is instead determined at 616 no such registry entry has a count value equal to zero, method 600 (at 622) selects a registry entry according to a predefined criteria (other than that of the registry entry having a count value which is equal to zero). By way of illustration and not limitation, a registry entry is selected at 622 based on the registry entry having a count value which is equal to a lowest count value of all registry entries. In other embodiments, the selecting at 622 is based on a least recently used (LRU) replacement scheme, a random replacement scheme, a round-robin replacement scheme, or the like. After the selecting at 622, method 600 (at 618) sets the identifier field of that picked registry entry to include the instruction identifier which corresponds to the evicted TLB entry. After setting the identifier field at 618, method 600 (at 620) sets the counter value of the picked registry entry to specify or otherwise indicate a threshold number of one or more subsequent prefetch instructions (if any) that are to be dropped.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/QAE74 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8A:
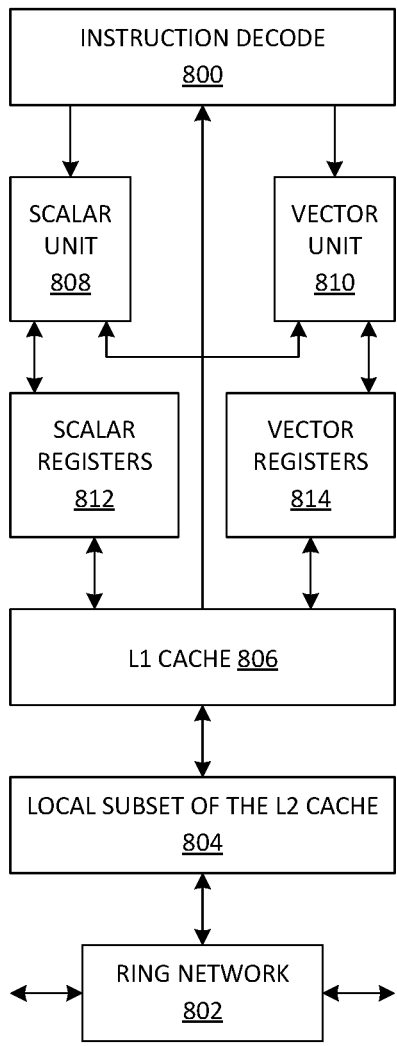
FIGS. 8A through 8B illustrate a block diagram of a more specific exemplary in-order core architecture, which core would be one of several logic blocks (including other cores of the same type and/or different types) in a chip.
Figure 8B:
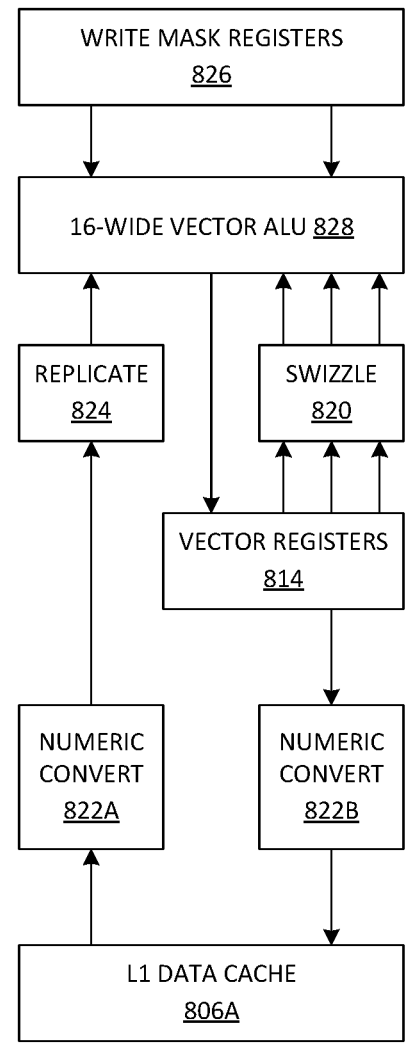

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG.

8B includes an L1 data cache 806A part of the L1 cache 806, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
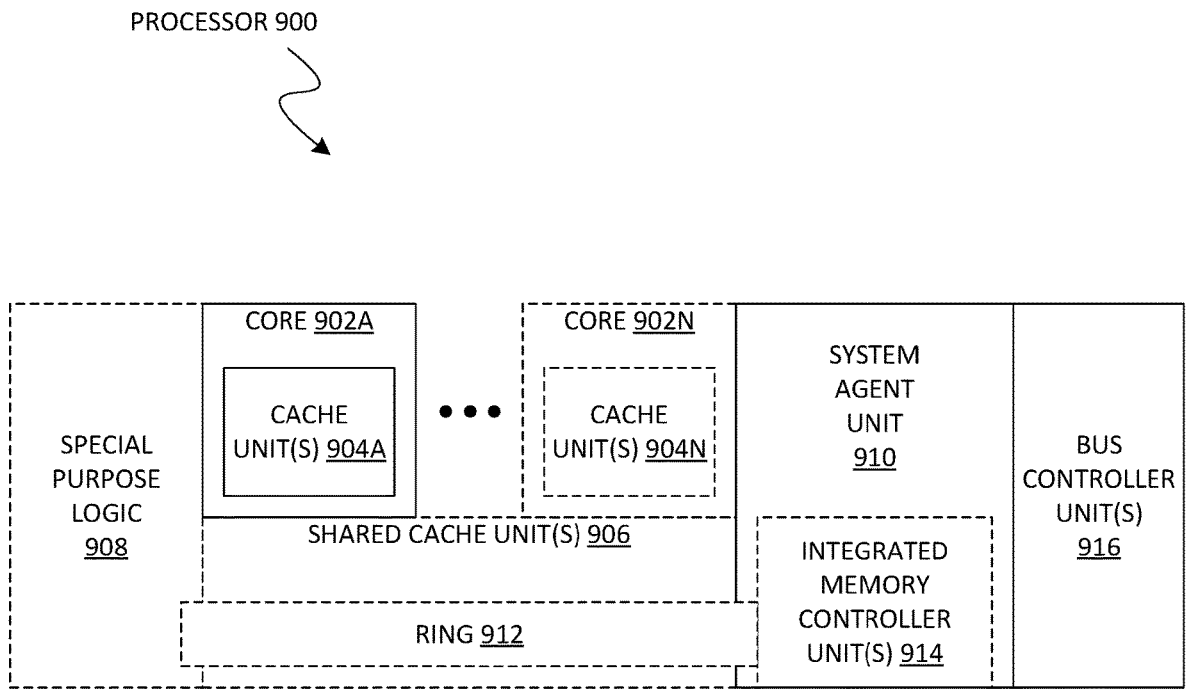
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes respective one or more levels of caches 904A-N within cores 902A-N, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the special purpose logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10 through 13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
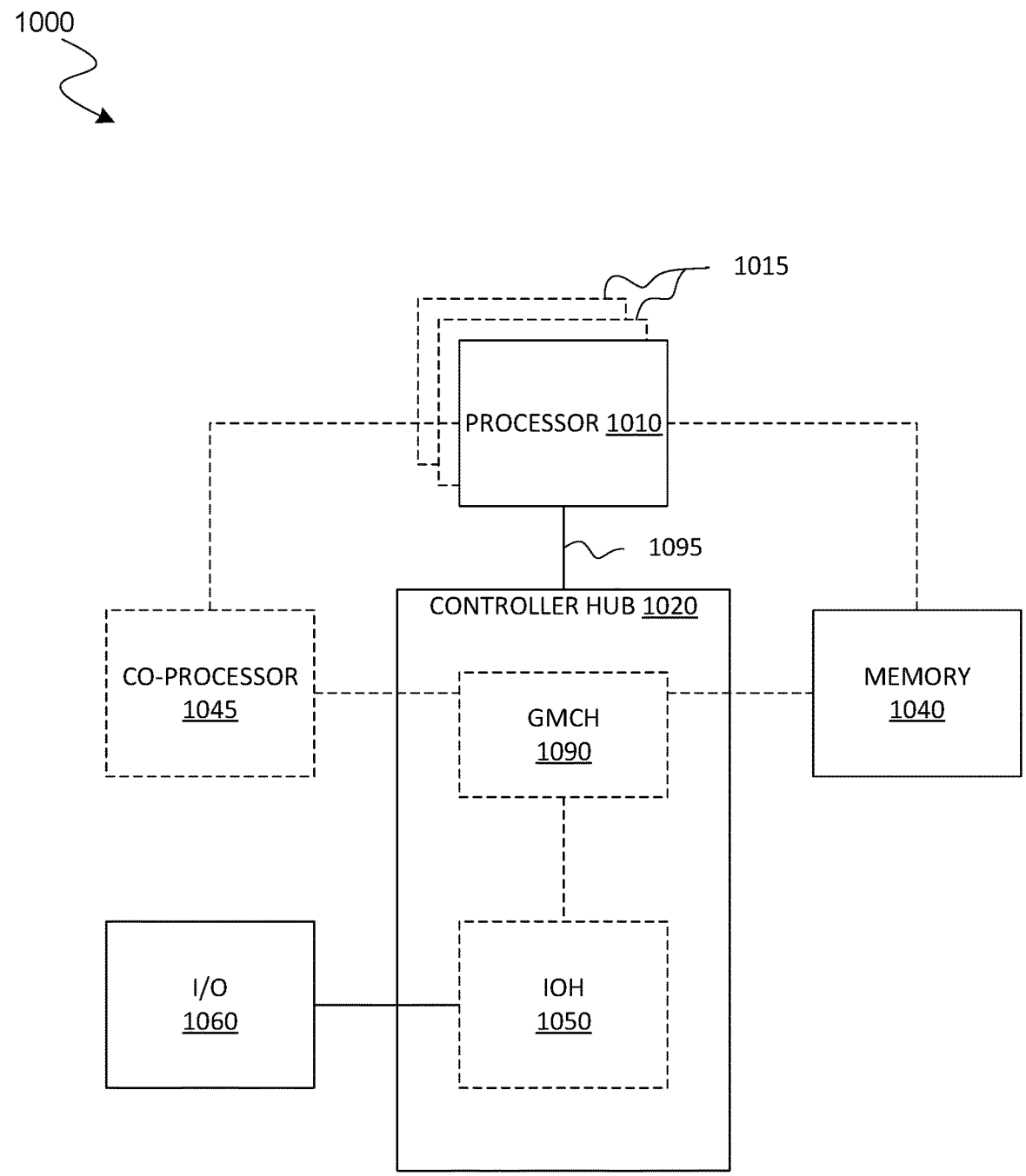
FIGS. 10 through 13 are block diagrams of exemplary computer architectures.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the processors 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
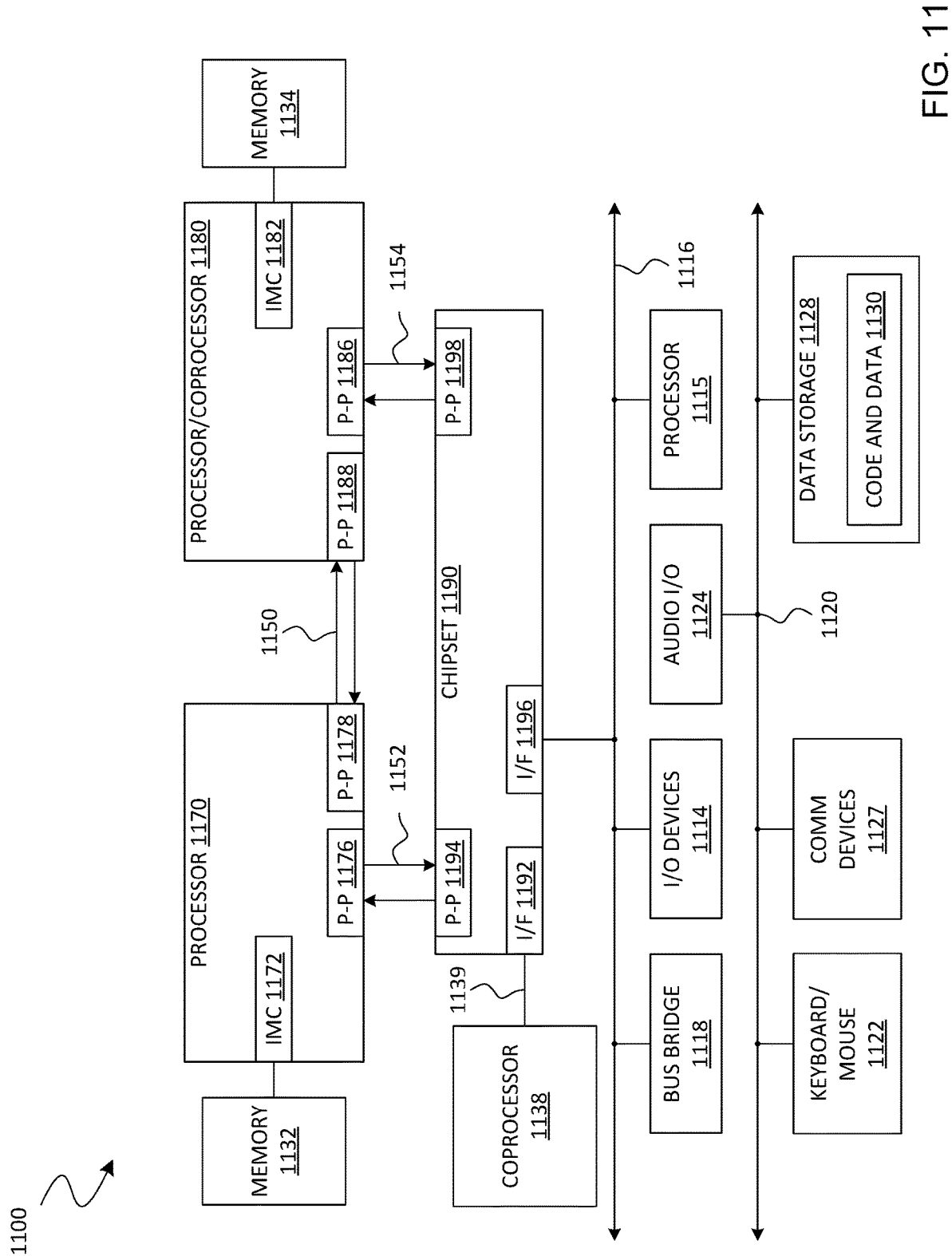

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller unit's point-to-point (P-P) interfaces 1176 and 1178; similarly, second processor 1180 includes P-P interfaces 1186 and 1188. Processors 1170, 1180 may exchange information via a point-to-point (P-P) interconnect 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1192 and an interconnect 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
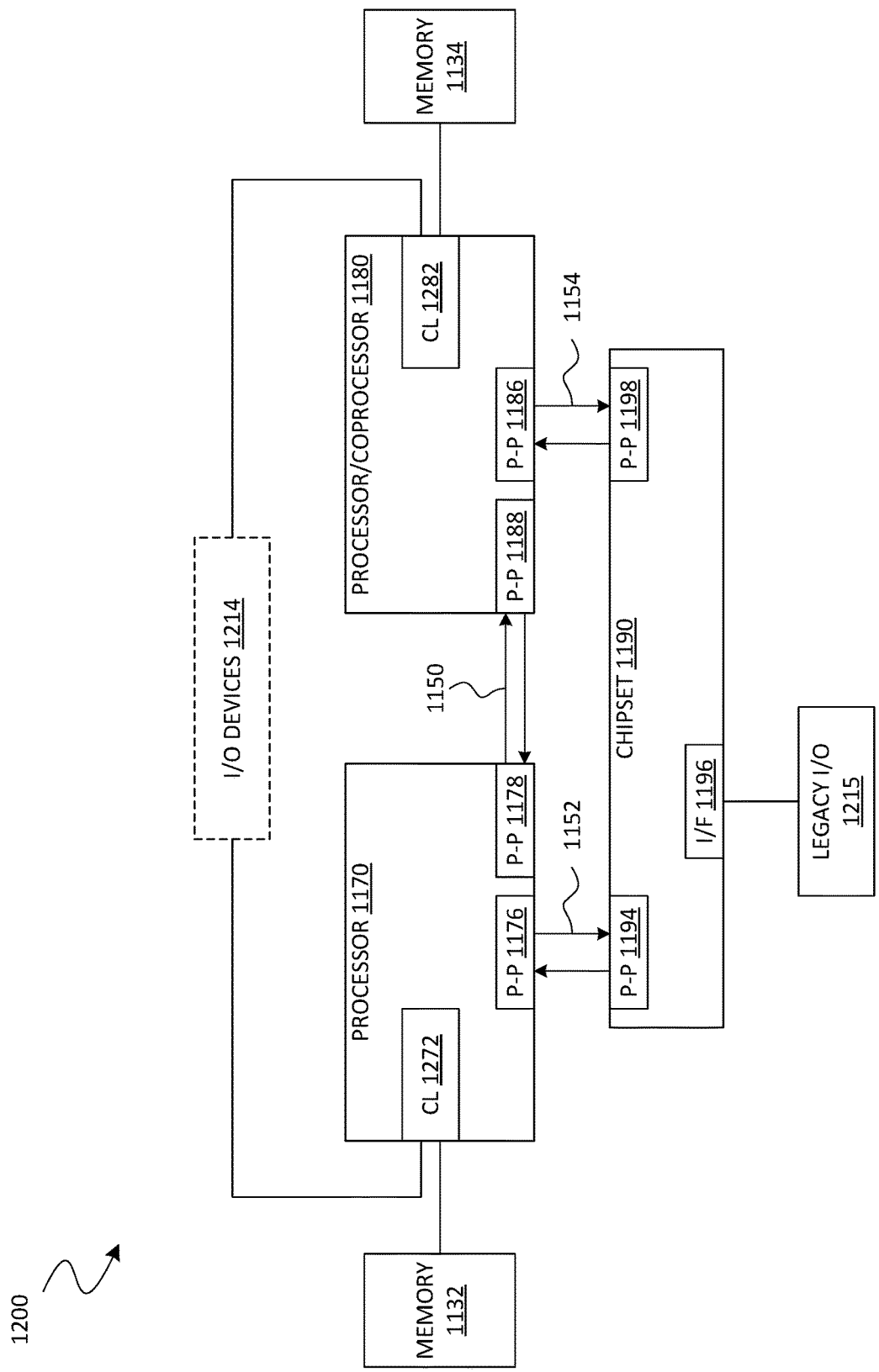

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1272 and 1282, respectively. Thus, the CL 1272, 1282 include integrated memory controller units and include I/O control logic. FIG. 12 illustrates that not only are the memories 1132, 1134 coupled to the CL 1272, 1282, but also that I/O devices 1214 are also coupled to the control logic 1272, 1282. Legacy I/O devices 1215 are coupled to the chipset 1190.

Figure 13:
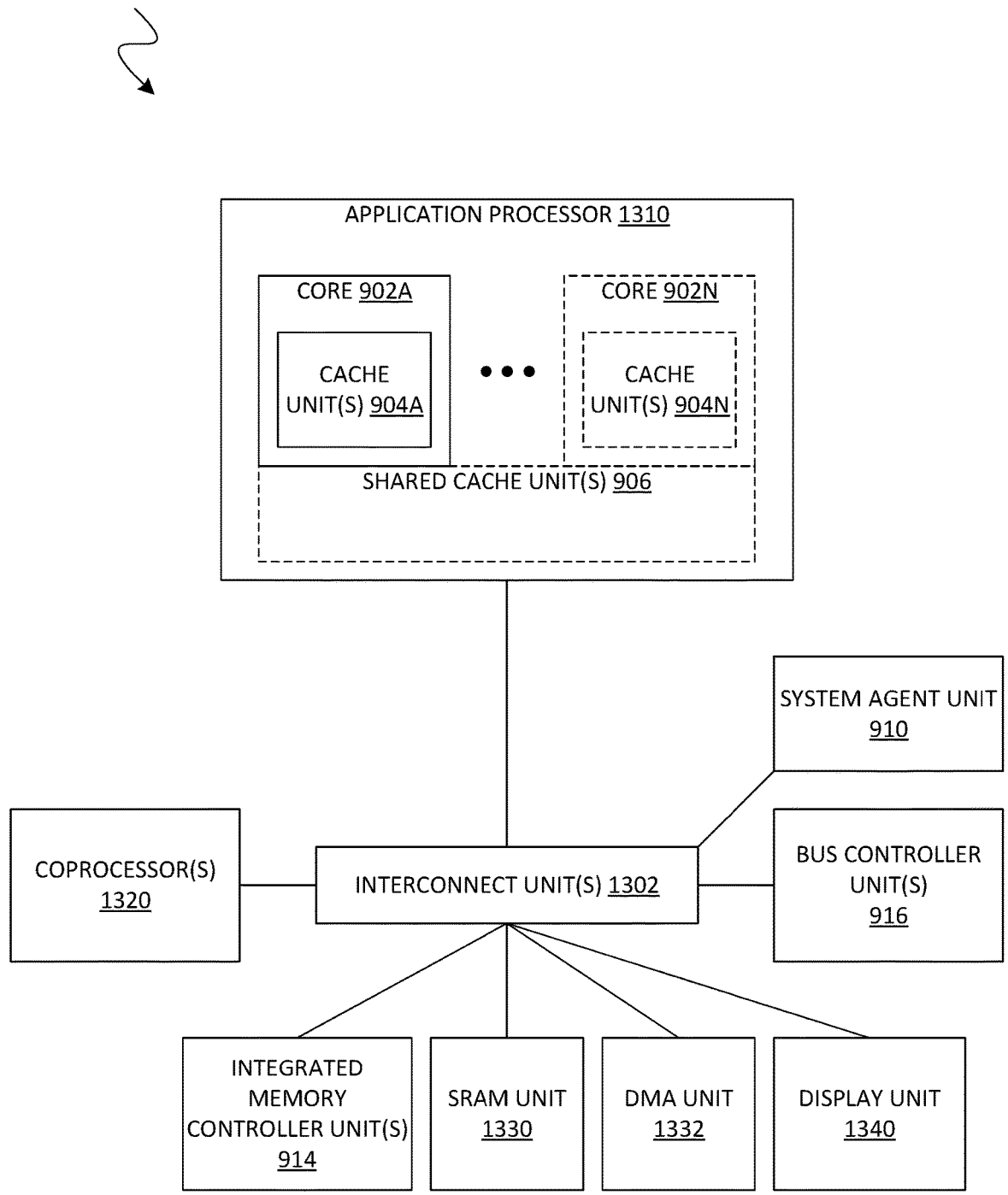

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (including Binary Translation, Code Morphing, etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
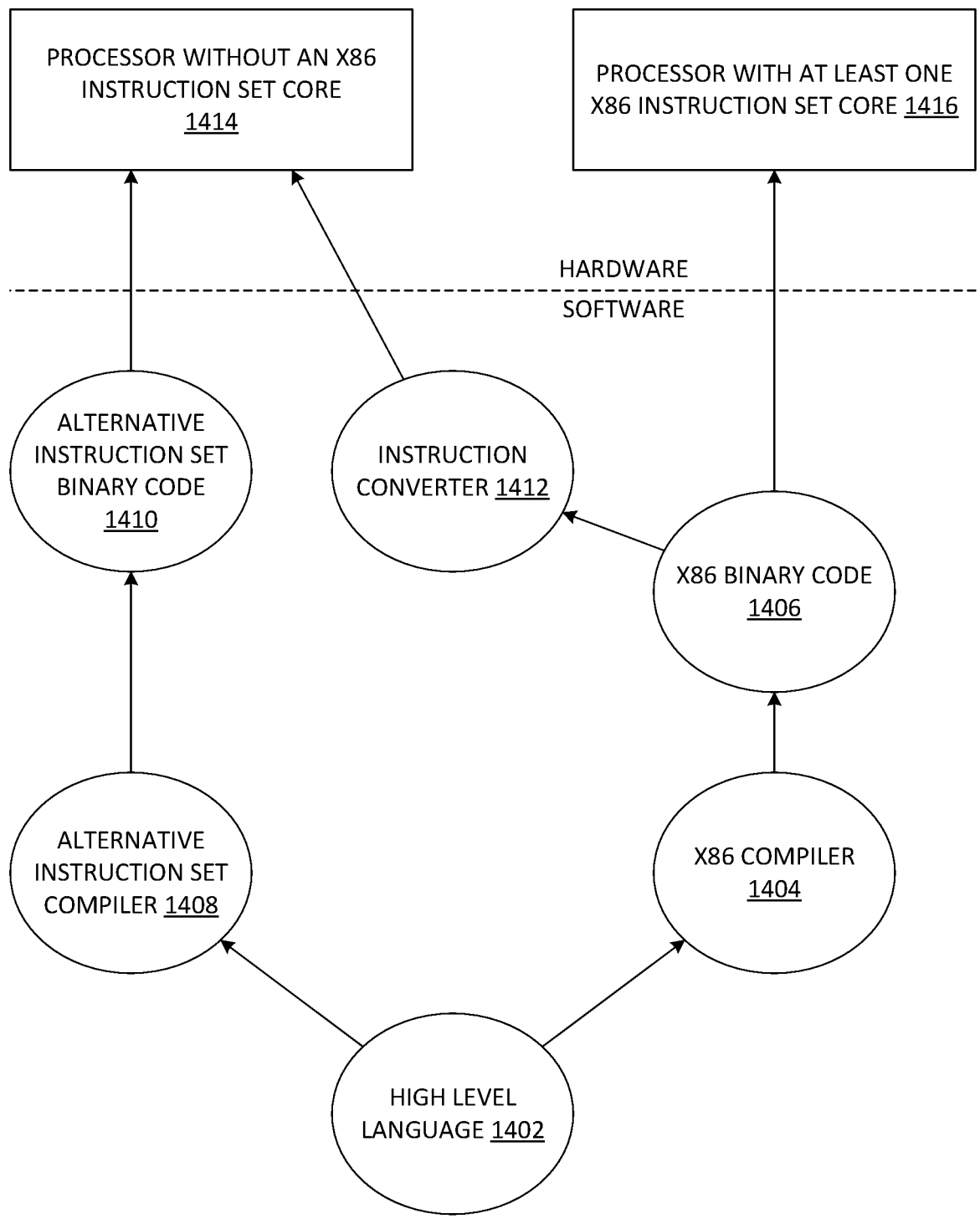
FIG. 14 is a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

In one or more first embodiments, a processor comprises a translation lookaside buffer (TLB) manager comprising circuitry to detect a first prefetch instruction, wherein a first entry of a TLB is generated based on the first prefetch instruction, to provide, based on the first prefetch instruction, first utilization information which corresponds to the first entry, wherein the first utilization information indicates that first data, which is prefetched by an execution of the first prefetch instruction, is classified as insufficiently utilized, wherein the utilization information is to comprise an instruction identifier which corresponds to the first prefetch instruction, a registry manager, coupled to the TLB manager to detect an eviction of the first entry while the first utilization information indicates that first data is classified as insufficiently utilized, and to generate, based on the eviction and the instruction identifier, a second entry of a registry of prefetch instructions, and a prefetch controller, coupled to the registry, comprising circuitry to prevent an execution of a second prefetch instruction based on the second entry.

In one or more second embodiments, further to the first embodiment, the first entry comprises the first utilization information.

In one or more third embodiments, further to the first embodiment or the second embodiment, the second entry is to comprise the instruction identifier and a value which represents a count of prefetch instructions to be dropped, and wherein, based on a detection of the second prefetch instruction, the registry manager is further to update the value to decrement the count of prefetch instructions to be dropped.

In one or more fourth embodiments, further to any of the first through third embodiments, the instruction identifier is based on a value of an instruction pointer.

In one or more fifth embodiments, further to any of the first through fourth embodiments, the TLB manager is further to detect a second prefetch instruction, wherein a third entry of the TLB is generated based on the second prefetch instruction, provide second utilization information which corresponds to the third entry, wherein the second utilization information indicates that second data, which is prefetched by an execution of the second prefetch instruction, is classified as insufficiently utilized, wherein the second utilization information comprises a second instruction identifier which corresponds to the second prefetch instruction, detect a use of the second data by an execution pipeline, and update the second utilization information, based on the use, to indicate that the second data is classified as sufficiently utilized.

In one or more sixth embodiments, further to the fifth embodiment, the registry manager is further to detect a second eviction of the third entry after the updating, perform an evaluation of the second utilization information based on the second eviction, and based on the evaluation, prevent a generation of a fourth entry of the registry.

In one or more seventh embodiments, further to any of the first through fourth embodiments, the registry manager is further to select a third entry of the registry to be replaced by the second entry, the third entry comprises a value which represents a count of prefetch instructions to be dropped, and the registry manager is to select the third circuitry based on one of an indication by the the value that the count is equal to zero, or an indication by the the value that the count is equal to a lowest count of multiple counts which are each represented by a different respective entry of the registry.

In one or more eighth embodiments, a method at a processor comprises with a translation lookaside buffer (TLB) manager detecting a first prefetch instruction, wherein a first entry of a translation lookaside buffer (TLB) is generated based on the first prefetch instruction, based on the detecting, providing first utilization information which corresponds to the first entry, wherein the first utilization information indicates that first data, which is prefetched by an execution of the first prefetch instruction, is classified as insufficiently utilized, wherein the utilization information comprises an instruction identifier corresponding to the first prefetch instruction, with a registry manager detecting an eviction of the first entry while the first utilization information indicates that first data is classified as insufficiently utilized, based on the eviction and the instruction identifier, generating a second entry of a registry of prefetch instructions, and with a prefetch controller, preventing an execution of a second prefetch instruction based on the second entry.

In one or more ninth embodiments, further to the eighth embodiment, the first entry comprises the first utilization information.

In one or more tenth embodiments, further to the eighth embodiment or the ninth embodiment, the second entry comprises the instruction identifier and a value which represents a count of prefetch instructions to be dropped, the method further comprises based on a detection of the second prefetch instruction, updating the value to decrement the count of prefetch instructions to be dropped.

In one or more eleventh embodiments, further to any of the eighth through tenth embodiments, the instruction identifier is based on a value of an instruction pointer.

In one or more twelfth embodiments, further to any of the eighth through eleventh embodiments, the method further comprises detecting a second prefetch instruction, wherein a third entry of the TLB is generated based on the second prefetch instruction, providing second utilization information which corresponds to the third entry, wherein the second utilization information indicates that second data, which is prefetched by an execution of the second prefetch instruction, is classified as insufficiently utilized, wherein the second utilization information comprises a second instruction identifier corresponding to the second prefetch instruction, detecting a use of the second data by an execution pipeline, and based on the use, updating the second utilization information to indicate that the second data is classified as sufficiently utilized.

In one or more thirteenth embodiments, further to the twelfth embodiment, the method further comprises detecting a second eviction of the third entry after the updating, based on the second eviction, performing an evaluation of the second utilization information, and based on the evaluation, preventing a generation of a fourth entry of the registry.

In one or more fourteenth embodiments, further to any of the eighth through eleventh embodiments, the method further comprises selecting a third entry of the registry to be replaced by the second entry, wherein the third entry comprises a value which represents a count of prefetch instructions to be dropped, and the selecting is based on one of the value indicating that the count is equal to zero, or the value indicating that the count is equal to a lowest count of multiple counts which are each represented by a different respective entry of the registry.

In one or more fifteenth embodiments, a system comprises a processor comprising a translation lookaside buffer (TLB) manager comprising circuitry to detect a first prefetch instruction, wherein a first entry of a TLB is generated based on the first prefetch instruction, to provide, based on the first prefetch instruction, first utilization information which corresponds to the first entry, wherein the first utilization information indicates that first data, which is prefetched by an execution of the first prefetch instruction, is classified as insufficiently utilized, wherein the utilization information is to comprise an instruction identifier which corresponds to the first prefetch instruction, a registry manager, coupled to the TLB manager, comprising circuitry to detect an eviction of the first entry while the first utilization information indicates that first data is classified as insufficiently utilized, and to generate, based on the eviction and the instruction identifier, a second entry of a registry of prefetch instructions, and third circuitry, coupled to the registry, to prevent an execution of a second prefetch instruction based on the second entry. The system further comprises a display device coupled to the processor, the display device to display an image based on a signal communicated with the processor.

In one or more sixteenth embodiments, further to the fifteenth embodiment, the first entry comprises the first utilization information.

In one or more seventeenth embodiments, further to the fifteenth embodiment or the sixteenth embodiment, the second entry is to comprise the instruction identifier and a value which represents a count of prefetch instructions to be dropped, and wherein, based on a detection of the second prefetch instruction, the registry manager is further to update the value to decrement the count of prefetch instructions to be dropped.

In one or more eighteenth embodiments, further to any of the fifteenth through seventeenth embodiments, the instruction identifier is based on a value of an instruction pointer.

In one or more nineteenth embodiments, further to any of the fifteenth through eighteenth embodiments, the TLB manager is further to detect a second prefetch instruction, wherein a third entry of the TLB is generated based on the second prefetch instruction, provide second utilization information which corresponds to the third entry, wherein the second utilization information indicates that second data, which is prefetched by an execution of the second prefetch instruction, is classified as insufficiently utilized, wherein the second utilization information comprises a second instruction identifier which corresponds to the second prefetch instruction, detect a use of the second data by an execution pipeline, and update the second utilization information, based on the use, to indicate that the second data is classified as sufficiently utilized.

In one or more twentieth embodiments, further to the nineteenth embodiment, the registry manager is further to detect a second eviction of the third entry after the updating, perform an evaluation of the second utilization information based on the second eviction, and based on the evaluation, prevent a generation of a fourth entry of the registry.

In one or more twenty-first embodiments, further to any of the fifteenth through eighteenth embodiments, the registry manager is further to select a third entry of the registry to be replaced by the second entry, the third entry comprises a value which represents a count of prefetch instructions to be dropped, and the registry manager is to select the third circuitry based on one of an indication by the the value that the count is equal to zero, or an indication by the the value that the count is equal to a lowest count of multiple counts which are each represented by a different respective entry of the registry.

Techniques and architectures for performing prefetch operations with a processor are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A processor comprising:
   a translation lookaside buffer (TLB) manager comprising circuitry to:
      detect a first prefetch instruction which corresponds to an instruction identifier, wherein a first entry of a TLB is to comprise translation information which corresponds to the first prefetch instruction; and
      provide, based on the first prefetch instruction, first utilization information which indicates that first data, which is prefetched by an execution of the first prefetch instruction, is classified as insufficiently utilized;
   a registry manager, coupled to the TLB manager to:
      detect an eviction of the first entry from the TLB while the first utilization information indicates that the first data is classified as insufficiently utilized; and
      generate, based on the eviction, a second entry of a registry of prefetch instructions, wherein the second entry is to correspond to the instruction identifier, the second entry to comprise a counter value to represent a number of any subsequent prefetch instructions that are to be dropped and are each to correspond to the instruction identifier; and
   a prefetch controller, coupled to the registry, comprising circuitry to drop a second prefetch instruction based on the second entry.

2. The processor of claim 1, wherein the first entry comprises the first utilization information.

3. The processor of claim 1, wherein, based on a detection of the second prefetch instruction, the registry manager is further to update the counter value to decrement the number of any subsequent prefetch instructions that are to be dropped.

4. The processor of claim 1, wherein the instruction identifier is based on a value of an instruction pointer.

5. The processor of claim 1, wherein the TLB manager is further to:
   detect a third prefetch instruction, wherein a third entry of the TLB is to comprise second translation information which corresponds to the third prefetch instruction;

provide, based on the third prefetch instruction, second utilization information which indicates that second data, which is prefetched by an execution of the third prefetch instruction, is classified as insufficiently utilized;
detect a use of the second data by an execution pipeline; and
update the second utilization information, based on the use, to indicate that the second data is classified as sufficiently utilized.

6. The processor of claim 5, wherein the registry manager is further to:
detect a second eviction of the third entry after the updating;
perform an evaluation of the second utilization information based on the second eviction; and
based on the evaluation, prevent a generation of a fourth entry of the registry.

7. The processor of claim 1, wherein:
the registry manager is further to select a third entry of the registry to be replaced by the second entry;
the third entry comprises a second counter value which represents a second number of any subsequent second prefetch instructions to be dropped; and
the registry manager is to select the third entry based on one of:
an indication by the second counter value that the second number is equal to zero; or
an indication by the second counter value that the second number is equal to a lowest number of multiple numbers which are each represented by a different respective entry of the registry.

8. A method at a processor, the method comprising:
with a translation lookaside buffer (TLB) manager:
detecting a first prefetch instruction which corresponds to an instruction identifier, wherein a first entry of a translation lookaside buffer (TLB) comprises translation information which corresponds to the first prefetch instruction;
based on the detecting, providing first utilization information which indicates that first data, which is prefetched by an execution of the first prefetch instruction, is classified as insufficiently utilized;
with a registry manager:
detecting an eviction of the first entry from the TLB while the first utilization information indicates that the first data is classified as insufficiently utilized;
based on the eviction, generating a second entry of a registry of prefetch instructions, wherein the second entry corresponds to the instruction identifier, the second entry comprising a counter value which represents a number of any subsequent prefetch instructions that are to be dropped and are each to correspond to the instruction identifier; and
with a prefetch controller, dropping a second prefetch instruction based on the second entry.

9. The method of claim 8, wherein the first entry comprises the first utilization information.

10. The method of claim 8, the method further comprising:
based on a detection of the second prefetch instruction, updating the counter value to decrement the number of any subsequent prefetch instructions which are to be dropped.

11. The method of claim 8, wherein the instruction identifier is based on a value of an instruction pointer.

12. The method of claim 8, further comprising:
detecting a third prefetch instruction, wherein a third entry of the TLB is to comprise second translation information which corresponds to the third prefetch instruction;
providing, based on the third prefetch instruction, second utilization information which indicates that second data, which is prefetched by an execution of the third prefetch instruction, is classified as insufficiently utilized;
detecting a use of the second data by an execution pipeline; and
based on the use, updating the second utilization information to indicate that the second data is classified as sufficiently utilized.

13. The method of claim 12, further comprising:
detecting a second eviction of the third entry after the updating;
based on the second eviction, performing an evaluation of the second utilization information; and
based on the evaluation, preventing a generation of a fourth entry of the registry.

14. The method of claim 8, further comprising selecting a third entry of the registry to be replaced by the second entry, wherein:
the third entry comprises a second counter value which represents a second number of any subsequent second prefetch instructions to be dropped; and
the selecting is based on one of:
the second counter value indicating that the second number is equal to zero; or
the second counter value indicating that the second number is equal to a lowest number of multiple numbers which are each represented by a different respective entry of the registry.

15. A system comprising:
a processor comprising:
a translation lookaside buffer (TLB) manager comprising circuitry to:
detect a first prefetch instruction which corresponds to an instruction identifier, wherein a first entry of a TLB is to comprise translation information which corresponds to the first prefetch instruction; and
provide, based on the first prefetch instruction, first utilization information which indicates that first data, which is prefetched by an execution of the first prefetch instruction, is classified as insufficiently utilized;
a registry manager, coupled to the TLB manager, comprising circuitry to:
detect an eviction of the first entry from the TLB while the first utilization information indicates that the first data is classified as insufficiently utilized; and
generate, based on the eviction, a second entry of a registry of prefetch instructions, wherein the second entry is to correspond to the instruction identifier, the second entry to comprise a counter value to represent a number of any subsequent prefetch instructions that are to be dropped and are each to correspond to the instruction identifier; and
third circuitry, coupled to the registry, to drop a second prefetch instruction based on the second entry; and
a display device coupled to the processor, the display device to display an image based on a signal communicated with the processor.

16. The system of claim 15, wherein the first entry comprises the first utilization information.

17. The system of claim 15, wherein, based on a detection of the second prefetch instruction, the registry manager is further to update the counter value to decrement the number of any subsequent prefetch instructions that are to be dropped.

18. The system of claim 15, wherein the TLB manager is further to:
- detect a third prefetch instruction, wherein a third entry of the TLB is to comprise second translation information which corresponds to the third prefetch instruction;
- provide, based on the third prefetch instruction, second utilization information which indicates that second data, which is prefetched by an execution of the third prefetch instruction, is classified as insufficiently utilized;
- detect a use of the second data by an execution pipeline; and
- update the second utilization information, based on the use, to indicate that the second data is classified as sufficiently utilized.

19. The system of claim 18, wherein the registry manager is further to:
- detect a second eviction of the third entry after the updating;
- perform an evaluation of the second utilization information based on the second eviction; and
- based on the evaluation, prevent a generation of a fourth entry of the registry.

20. The system of claim 15, wherein:
the registry manager is further to select a third entry of the registry to be replaced by the second entry;
the third entry comprises a second counter value which represents a second number of any subsequent second prefetch instructions to be dropped; and
the registry manager is to select the third entry based on one of:
- an indication by the second counter value that the second number is equal to zero; or
- an indication by the second counter value that the second number is equal to a lowest number of multiple numbers which are each represented by a different respective entry of the registry.

* * * * *